July 16, 1968     J. J. FESCO     3,392,906
VACUUM CLEANER FILTER BAG
Filed April 11, 1967
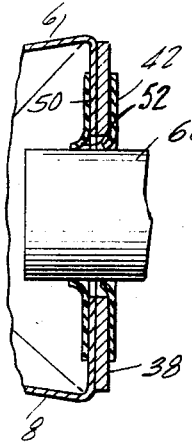
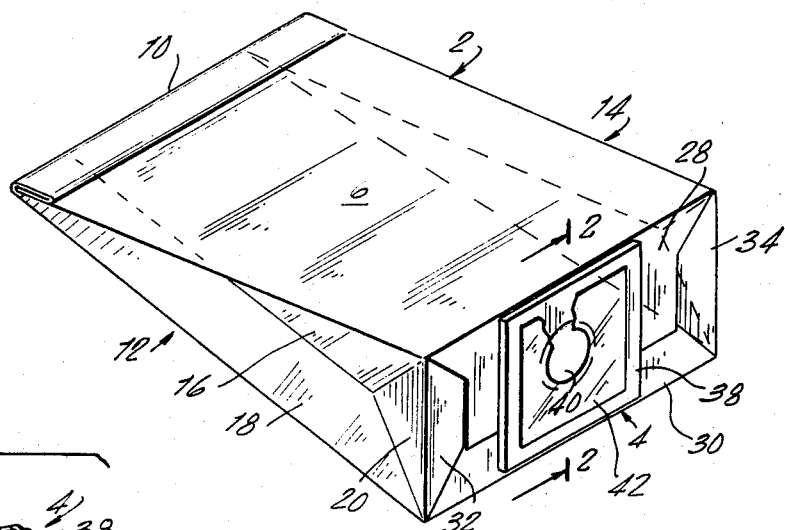
INVENTOR.
JOHN J. FESCO
BY Friedman & Goodman
ATTORNEYS United States Patent Office 3,392,906
Patented July 16, 1968

3,392,906
VACUUM CLEANER FILTER BAG
John J. Fesco, Baldwin, N.Y., assignor to Studley Paper Company, Inc., Far Rockaway, N.Y., a corporation of New York
Filed Apr. 11, 1967, Ser. No. 629,948
3 Claims. (Cl. 229—53)

ABSTRACT OF THE DISCLOSURE

This invention and this disclosure are directed to a vacuum cleaner filter bag. More specifically, this invention and this disclosure are directed to a vacuum cleaner filter bag of the disposable type provided with a collar formed of a supporting member and a polyolefin sealing member overlying and secured to the same, said polyolefin sealing member being apertured to permit the ready ingress and egress of the discharge end of a vacuum cleaner hose or port.

BACKGROUND OF THE INVENTION

Field of the invention

This invention resides in the field of vacuum cleaner filter bags and especially in the field of vacuum cleaner filter bags of the disposable type. More specifically, this invention resides in the field of vacuum cleaner filter bag collars.

Discussion of the prior art

Vacuum cleaner filter bags of the disposable type are old. Many of these, particularly those designed for use in connection with a canister type vacuum cleaner are provided with a port through which the dust, dirt and debris enter. Around the port there is a vacuum cleaner filter bag collar comprising a support piece constructed of cardboard or similar type material which support piece is provided with a hole in the middle of it, the hole being the intake port. Over the support piece is mounted a rubber or rubber-like piece having a hole in the middle of it which has a diameter less than the diameter of the intake port. The rubber piece is placed over the support piece such that the hole in the rubber piece is in registry with the intake port hole, preferably in the middle of it. Thus, when the discharge port of the vacuum cleaner which port has an outside diameter just less than the diameter of the hole in the supporting piece but greater than the diameter of the hole in the rubber piece passes into the bag, the rubber surrounding the hole is deformed inwardly and held against the discharge port to insure maximum vacuum negative pressure and maximum vacuum cleaner efficiency. In addition, the use of the inwardly deforming rubber piece helps to prevent inadvertent loss of dirt out of the bag through the intake port.

The use of rubber sealing members is quite costly and has otherwise been found to have a number of disadvantages.

SUMMARY AND OBJECTS OF THE INVENTION

It is an object of this invention, therefore, to provide a new and improved vacuum cleaner filter bag having a collar so constructed as to overcome the disadvantages of prior art vacuum cleaner filter bags.

It is another object of this invention to provide a new and improved vacuum cleaner filter bag collar constructed of a material capable of assuming a deformed shape adjacent a vacuum cleaner discharge port for a long period of time without losing its deformation.

It is still another object of this invention to provide such a vacuum cleaner filter bag collar assembly so constructed that it is capable of withstanding the tensions placed thereon during the course of insertion, use and removal without tearing, delamination or damage.

These and other objects of this invention will become apparent from the following complete description of the invention, accompanying drawings and appended claims.

STATEMENT OF THE INVENTION

Broadly, this invention contemplates an improvement in a vacuum cleaner filter bag collar assembly, said improvement comprising a stiff support piece provided with an aperture therein communicating with the interior of the bag and a polyolefin sheet material sealing member overlying at least a major portion of the area of said support piece and at least a portion of said aperture.

In a particularly desirable embodiment, this invention contemplates an improvement in a vacuum cleaner filter bag collar assembly, said improvement comprising a stiff planar, square cut support member provided with an aperture therein communicating with the interior of the bag and a transparent polyethylene sheet material similarly square cut overlying at least a major portion of the area of the support member and at least a portion of said aperture, said transparent polyethylene sheet material provided with a hole therein of lesser diameter than said aperture.

In another embodiment, this invention contemplates an improvement in a vacuum cleaner filter bag collar assembly, said improvement comprising a stiff square cut planar support member provided with an aperture therein communicating with the interior of the bag, a first transparent polyethylene sheet material comprising a sealing member overlying at least a portion of one surface of said support member and at least a portion of said aperture, said transparent polyethylene sheet material provided with a hole therein of lesser diameter than said aperture, and a second sheet of polyolefin, e.g., polyethylene sheet material having an aperture therein in registry with the aperture in said supporting piece, said second sheet disposed on the opposing side of the support member, said aperture of said second sheet having a diameter smaller than the hole in said first polyethylene sheet material.

BRIEF DESCRIPTION OF THE DRAWINGS

The invention in its various embodiments is illustrated in the accompanying drawings, in which:

FIGURE 1 is a perspective view of a bag fitted with a collar assembly of the invention. This figure is partially broken away;

FIGURE 2 is an exploded sectional view taken along the line 2—2 of FIGURE 1. In this view the discharge port of a vacuum cleaner is shown;

FIGURE 3 is a view similar to FIGURE 2 showing the vacuum cleaner discharge port in place in a vacuum cleaner filter bag;

FIGURE 4 is a sectional view taken along the line 4—4 of FIGURE 3;

FIGURE 5 is a view similar to FIGURE 2;

FIGURE 6 is a sectional view similar to FIGURE 2 showing an embodiment of the invention; and FIGURE 7 is a sectional view of the embodiment of the invention shown in FIGURE 6. FIGURE 7 resembles FIGURE 3.

DESCRIPTION OF THE PREFERRED EMBODIMENTS

Referring to the figures, a bag 2 provided with a collar 4, a first body portion 6, a second body portion 8 meeting at the bottom in a fold 10 and adhesively secured together at the fold 10 has side portions 12 and 14. Side portion 12 consists of gussets 16 and 18 and infold 20.

Side portion 14 consists of gussets 22 and 24 and infold 26. The top of the bag 2 beneath collar 4 is formed by overlying flaps 28, 30, 32 and 34 adhesively secured to one another as shown in FIGURE 1. An intake port in the form of a circular aperture is provided in the top of the bag as seen in FIGURE 4. A stiff collar support member 38 is adhesively secured to the bag. Collar support member 38 is provided with a circular aperture 40 in registry with aperture 36. In the embodiment of the invention illustrated the support member is planar and of generally square conformation.

A thin sheet of flexible polyolefin suitably and preferably transparent polyethylene 42 overlies a portion of collar support member 38. Said sealing member 42 is similarly of square conformation but of somewhat smaller dimension than the support member 38 leaving an exposed margin on the support. However, the sealing member overlies a major area of the support. A circular aperture 44 of less diameter than aperture 40 is provided in sheet 42 so that about the periphery of aperture 40 and overlying it is a portion of the polyethylene sheet sealing member 42. Aperture 44 is in registry with aperture 36 in the bag and aperture 40 in the supporting member 38 as seen in FIGURE 2 and FIGURE 3.

It has been recognized that effective adhesion of polyolefin sheet material such as polyethylene to cardboard and the like is difficult to accomplish. Although adhesives or heat seals have at times been utilized, the bond secured has often been unsatisfactory. This problem is particularly troublesome in an application of this type wherein the bond is subjected to strain and shearing forces in use and particularly as the discharge port is inserted and removed from engagement therewith. Under such circumstances delamination of the sealing member from the support member has been encountered. It has however been found that when the contact area between the two members is on the major portion of the respective parts the delaminating effect is considerably reduced or entirely eliminated using heat sealing or adhesive methods. A particularly effective bond is achieved when the conformation of the sealing member is quadrilateral in form and the aperture is circular. By providing a difference in geometry of the peripheral conformation of the sealing member with respect to the conformation of the aperture. A possible explanation for the superior effect achieved may be that the shearing forces are thus unequally distributed and the integrity of the bond as a whole is thus maintained.

The use of the polyolefin material which is self-lubricating facilitates passing the discharge port 60 of a vacuum cleaner therein without tearing the sealing material causing any wearing effect or the like on the discharge port. The polyolefin material readily deforms as seen in FIGURES 2, 4, 5, and 7, and holds its deformed shape over a substantial period of time. The discharge port in position is thus snugly fitted and sealed with respect to the vacuum cleaner filter bag. Removal of the discharge port does not impair the polyolefin material as the material readily moves in the direction of movement of the discharge port until it returns to its original position.

The use of a polyolefin sheet which is transparent such as most of the polyethylene film or sheet material made enables the operator to see into the bag through the aperture and polyethylene more readily and also observe the height of the deposited dust and dirt therein. This enables him to readily know when it is a proper time for replacement of the bag.

In another embodiment, the opposing or interior wall of the support member is also provided with a sheet of polyolefin sheet material of suitably transparent polyethylene. This second or interior sheet 50 is shown in FIGURE 6 and FIGURE 7. It is similarly adhesively secured to the bag top or heat fused thereto. Sheet 50 has an aperture 52 therein of less diameter than aperture 44 as seen in FIGURE 6, but is in registry with apertures 36, 40 and 44. The interior sheet 50 is advantageously of thinner gauge or more easily stretchable than the exterior sheet 42 to compensate for the smaller diameter of aperture 52. It will also be noted that a more effective bond may be achieved for the interior sheet 50 since it is captive between the support member and the bag material and may also be adhered to the latter material.

The use of a pair of polyolefin sheets, namely on the interior and exterior surfaces of the support member, as shown in FIGURES 6 and 7, enables an even more secure fit of the bag 2 about the discharge port 60 insuring that no dust or dirt can leave the bag in use.

Polyolefins suitable for use in the instant invention include flexible films of polyethylene, and polypropylene, and the like. Because of availability and cost, polyethylene is preferred. It should be noted that the invention does not absolutely require use of a transparent polyolefin sheet. However, the objects of the invention are more fully obtained using a transparent polyolefin sheet than one that is opaque or translucent.

The terms and expressions used herein are terms of illustration and not of limitation as there is no intention, in the use of such terms and expressions, of excluding any equivalents, or portions thereof, as there may be many modifications and departures from the above disclosure within the scope of the appended claims. For instance, the bag can be made with polyolefin sheet material almost entirely overlying the apertures whereby when the discharge port of the vacuum passes into the bag the hole in the polyolefin sheet is enlarged to the proper size thus providing a snug fit of the bag to the discharge port.

I claim:

1. An improvement in a collar assembly for a vacuum cleaner filter bag, said collar assembly comprising a stiff support member provided with an aperture for communication with the interior of the bag and a sealing means therefor, said aperture being circular, said sealing means comprising a first polyolefin sheet material secured along one surface of and overlying at least a portion of said support member and at least a portion of said aperture, said first polyolefin sheet material being provided with a circular hole therein of lesser diameter than said aperture, and a second sheet of polyolefin sheet material secured along the other surface of said support member having an aperture therein in registry with the aperture in said supporting member.

2. An improvement according to claim 1, wherein said first polyolefin sheet material and said second sheet of polyolefin are provided with apertures of differing diameter.

3. An improvement according to claim 2, wherein said first polyolefin sheet material and said second sheet of polyolefin are polyethylene.

References Cited

UNITED STATES PATENTS 3,245,605    4/1966    Meyerhoefer _____ 229—53

DAVID M. BOCKENEK, *Primary Examiner.*